United States Patent
Adolphs et al.

(10) Patent No.: US 9,751,278 B2
(45) Date of Patent: Sep. 5, 2017

(54) MULTI-AXIAL FABRICS, POLYMER-FIBER LAMINATES, AND BODIES INCORPORATING SAME FOR CONNECTING APPLICATIONS

(71) Applicant: OCV Intellectual Capital, LLC, Toledo, OH (US)

(72) Inventors: Georg Adolphs, Sabadell (ES); Lihua Liu, Shanghai (CN); Christopher John Skinner, Tervuren (BE)

(73) Assignee: OCV Intellectual Capital, LLC, Toledo, OH (US)

( * ) Notice: Subject to any disclaimer, the term of this patent is extended or adjusted under 35 U.S.C. 154(b) by 172 days.

(21) Appl. No.: 14/441,250

(22) PCT Filed: Nov. 25, 2013

(86) PCT No.: PCT/US2013/071563
§ 371 (c)(1),
(2) Date: May 7, 2015

(87) PCT Pub. No.: WO2014/082024
PCT Pub. Date: May 30, 2014

(65) Prior Publication Data
US 2015/0290906 A1    Oct. 15, 2015

Related U.S. Application Data

(60) Provisional application No. 61/729,996, filed on Nov. 26, 2012.

(51) Int. Cl.
*B32B 5/02* (2006.01)
*B32B 5/06* (2006.01)
(Continued)

(52) U.S. Cl.
CPC ............... *B32B 5/026* (2013.01); *B32B 5/02* (2013.01); *B32B 5/024* (2013.01); *B32B 5/06* (2013.01);
(Continued)

(58) Field of Classification Search
CPC ...................................................... B32B 5/026
(Continued)

(56) References Cited

U.S. PATENT DOCUMENTS 5,080,141 A    1/1992   Bottger et al.
5,188,878 A    2/1993   Takezawa et al.
(Continued)

FOREIGN PATENT DOCUMENTS

CN    201046617    4/2008
EP    0690681      1/1996
(Continued)

OTHER PUBLICATIONS

Office Action from CN Application No. 201380071409.6 dated Jul. 1, 2016.
(Continued)

*Primary Examiner* — Brent O'Hern
(74) *Attorney, Agent, or Firm* — Calfee, Halter & Griswold LLP

(57) ABSTRACT

Multi-axial fabrics (including hybrid, multi-axial fabrics) and polymer-fiber laminates are disclosed. Bodies (e.g., cylindrical and/or flanged bodies) incorporating the fabrics and/or laminates are also disclosed. The bodies exhibit improved performance and/or reduced costs for connecting applications.

20 Claims, 7 Drawing Sheets

(51) Int. Cl.
   *B32B 5/08*    (2006.01)
   *B32B 5/10*    (2006.01)
   *B32B 5/12*    (2006.01)
   *B32B 7/08*    (2006.01)
   *D03D 15/00*   (2006.01)
   *D04B 21/20*   (2006.01)

(52) U.S. Cl.
   CPC .............. *B32B 5/08* (2013.01); *B32B 5/10* (2013.01); *B32B 5/12* (2013.01); *B32B 7/08* (2013.01); *D03D 15/00* (2013.01); *D04B 21/20* (2013.01); *B32B 2262/02* (2013.01); *B32B 2262/0269* (2013.01); *B32B 2262/101* (2013.01); *B32B 2262/106* (2013.01); *B32B 2597/00* (2013.01); *B32B 2603/00* (2013.01)

(58) Field of Classification Search
   USPC ........................................................ 428/113
   See application file for complete search history.

(56) References Cited

U.S. PATENT DOCUMENTS

| | | | |
|---|---|---|---|
| 5,198,281 | A | 3/1993 | Muzzy et al. |
| 5,954,917 | A | 9/1999 | Jackson et al. |
| 7,841,835 | B2 | 11/2010 | Bagepalli et al. |
| 2005/0186081 | A1 | 8/2005 | Mohamed |
| 2006/0249868 | A1 | 11/2006 | Brown et al. |
| 2011/0146040 | A1 | 6/2011 | Heinrich et al. |
| 2012/0015135 | A1 | 1/2012 | Beraud et al. |

FOREIGN PATENT DOCUMENTS

| | | | |
|---|---|---|---|
| EP | 1174533 | 1/2002 | |
| EP | 1987185 | 11/2008 | |
| ES | WO 2007057430 A1 * | 5/2007 | ............ B29C 70/22 |
| GB | 2451192 | 3/2011 | |
| WO | 94/02151 | 2/1994 | |
| WO | 2007/057430 | 5/2007 | |
| WO | 2012/096696 | 7/2012 | |

OTHER PUBLICATIONS

International Search Report and Written Opinion from PCT/US13/071563 dated Feb. 24, 2014.
Ultrablade, Improvements in Root Joint Design and Material Selections, Owens Corning, AMI Conference Wind Turbine Blade Manufacture, Nov. 27-29, 2012, 15 pgs.
LMS Engineering Innovation, OCV 60[m] Blade Root Parametric Study, 2012, 70 pages.
Office Action from CN Application No. 201380071409.6 dated Mar. 2, 2017.
Office Action from MX Application No. 15/06603 dated Jul. 3, 2017.
Office Action from CN Application No. 201380071409.6 dated Jun. 21, 2017.
Communication Pursuant to Article 94(3) EPC from EP Application No. 13814280.7 dated Jul. 18, 2017.

* cited by examiner

US 9,751,278 B2

MULTI-AXIAL FABRICS, POLYMER-FIBER LAMINATES, AND BODIES INCORPORATING SAME FOR CONNECTING APPLICATIONS

RELATED APPLICATIONS

The present application is the U.S. national phase entry of PCT/US2013/071563 with an international filing date of Nov. 25, 2013 which claims priority to U.S. provisional application no. 61/729,996, filed on Nov. 26, 2012, both of which are hereby incorporated by reference in their entirety.

FIELD

The general inventive concepts relate to multi-axial fabrics and polymer-fiber laminates, as well as cylindrical and/or flanged bodies incorporating same for bolt-connected applications.

BACKGROUND

Applications of fabric-based polymer-fiber laminates, such as the bolted connections between a wind turbine blade and a hub in a wind turbine system, are often characterized by the structures formed from the laminates being subjected to forces of different magnitudes being applied in different directions. Thus, there is an unmet need for laminates that more effectively and/or efficiently handle these forces given the differences in magnitude and direction.

SUMMARY

The general inventive concepts relate to and contemplate multi-axial fabrics (including hybrid, multi-axial fabrics) and polymer-fiber laminates including said fabrics. Bodies (e.g., cylindrical and/or flanged bodies) incorporating the fabrics and/or laminates are also encompassed by the general inventive concepts. The bodies exhibit improved performance and/or reduced costs (e.g., for connecting applications) due to the improved fabrics and laminates.

A laminate, according to one exemplary embodiment, includes at least one reinforcing layer. The reinforcing layer comprises a fabric including a plurality of reinforcing fibers. A first group of the reinforcing fibers has a first orientation within the fabric; a second group of the reinforcing fibers has a second orientation within the fabric, the second orientation differing from the first orientation by a first offset; and a third group of the reinforcing fibers has a third orientation within the fabric, the third orientation differing from the first orientation by a second offset.

In one exemplary embodiment, the fabric is a unitary fabric including the reinforcing fibers. In one exemplary embodiment, the fabric is one of knitted, woven, and laid.

In one exemplary embodiment, the fabric is formed from a first fabric and a second fabric; wherein the first fabric includes the first group of the reinforcing fibers; and wherein the second fabric includes the second group of the reinforcing fibers and the third group of the reinforcing fibers. In one exemplary embodiment, the first fabric is one of knitted, woven, and laid; and the second fabric is one of knitted, woven, and laid. In one exemplary embodiment, the first fabric and the second fabric are stitched together. In one exemplary embodiment, the first fabric comprises a first reinforcing layer of a laminate and the second fabric comprises a second reinforcing layer of the laminate; and wherein a thickness of the first reinforcing layer differs from a thickness of the second reinforcing layer.

In one exemplary embodiment, the fabric is formed from a first fabric, a second fabric, and a third fabric; wherein the first fabric includes the first group of the reinforcing fibers; wherein the second fabric includes the second group of the reinforcing fibers; and wherein the third fabric includes the third group of the reinforcing fibers. In one exemplary embodiment, the first fabric is one of knitted, woven, and laid; the second fabric is one of knitted, woven, and laid; and the third fabric is one of knitted, woven, and laid. In one exemplary embodiment, the first fabric, the second fabric, and the third fabric are stitched together. In one exemplary embodiment, the first fabric comprises a first reinforcing layer of a laminate; the second fabric comprises a second reinforcing layer of the laminate; and the third fabric comprises a third reinforcing layer of the laminate; wherein a thickness of the first reinforcing layer differs from a thickness of the second reinforcing layer; wherein a thickness of the first reinforcing layer differs from a thickness of the third reinforcing layer; and wherein the thickness of the second reinforcing layer is substantially the same as the thickness of the third reinforcing layer.

In one exemplary embodiment, the first orientation is x; the first offset is approximately x−10°; and the second offset is approximately x+10°.

In one exemplary embodiment, the first orientation is x; the first offset is approximately x−15°; and the second offset is approximately x+15°.

In one exemplary embodiment, the first orientation is x; the first offset is approximately x−20°; and the second offset is approximately x+20°.

In one exemplary embodiment, the first orientation is x; the first offset is approximately x−25°; and the second offset is approximately x+25°.

In one exemplary embodiment, the first orientation is x; the first offset is approximately x−30°; and the second offset is approximately x+30°.

In one exemplary embodiment, the first orientation is x; the first offset is approximately x−45°; and the second offset is approximately x+45°.

In one exemplary embodiment, the first orientation is x; the first offset is between x−10° and x−30°; and the second offset is between x+10° and x+30°.

In one exemplary embodiment, the first orientation is x; the first offset is between x−5° and x−45°; and the second offset is between x+5° and x+45°.

In one exemplary embodiment, the first orientation is 0°. In one exemplary embodiment, the first orientation is 90°.

In one exemplary embodiment, an absolute value of the first offset is different from an absolute value of the second offset.

In one exemplary embodiment, the first group of the reinforcing fibers accounts for approximately 20 wt % of the reinforcing fibers; and the second group of the reinforcing fibers and the third group of the reinforcing fibers account for approximately 80 wt % of the reinforcing fibers.

In one exemplary embodiment, the first group of the reinforcing fibers accounts for approximately 50 wt % of the reinforcing fibers; and the second group of the reinforcing fibers and the third group of the reinforcing fibers account for approximately 50 wt % of the reinforcing fibers.

In one exemplary embodiment, the first group of the reinforcing fibers accounts for between 10 wt % to 50 wt % of the reinforcing fibers; and the second group of the reinforcing fibers and the third group of the reinforcing fibers account for between 50 wt % to 90 wt % of the reinforcing fibers.

In one exemplary embodiment, the reinforcing fibers are selected from the group consisting of polymer fibers, carbon fibers, aramide fibers, and glass fibers. In one exemplary embodiment, the reinforcing fibers are glass fibers selected from the group consisting of A-type glass fibers, C-type glass fibers, G-glass fiber, E-type glass fibers, S-type glass fibers, H-type glass fibers, and E-CR-type glass fibers.

In one exemplary embodiment, the first group of the reinforcing fibers includes a plurality of first fibers and a plurality of second fibers, wherein an elastic modulus of the first fibers differs from an elastic modulus of the second fibers. In one exemplary embodiment, the first fibers are H-type glass fibers and the second fibers are E-CR-type glass fibers.

In one exemplary embodiment, the first group of the reinforcing fibers includes a plurality of first fibers and a plurality of second fibers, wherein a tensile strength of the first fibers differs from a tensile strength of the second fibers.

In one exemplary embodiment, the first group of the reinforcing fibers includes a plurality of first fibers and a plurality of second fibers, wherein the first fibers have a higher elastic modulus than the second fibers. The first fibers account for between 10 wt % to 40 wt % of the first group of the reinforcing fibers, while the second fibers account for between 60 wt % to 90 wt % of the first group of the reinforcing fibers.

In one exemplary embodiment, the first group of the reinforcing fibers includes a plurality of first fibers and a plurality of second fibers, wherein the first fibers have a higher elastic modulus than the second fibers. The first fibers account for between 20 wt % to 30 wt % of the first group of the reinforcing fibers, while the second fibers account for between 70 wt % to 80 wt % of the first group of the reinforcing fibers.

In one exemplary embodiment, the first group of the reinforcing fibers includes a plurality of first fibers and a plurality of second fibers, wherein the first fibers have a higher tensile strength than the second fibers. The first fibers account for between 10 wt % to 40 wt % of the first group of the reinforcing fibers, while the second fibers account for between 60 wt % to 90 wt % of the first group of the reinforcing fibers.

In one exemplary embodiment, the first group of the reinforcing fibers includes a plurality of first fibers and a plurality of second fibers, wherein the first fibers have a higher tensile strength than the second fibers. The first fibers account for between 20 wt % to 30 wt % of the first group of the reinforcing fibers, while the second fibers account for between 70 wt % to 80 wt % of the first group of the reinforcing fibers.

In one exemplary embodiment, the first group of the reinforcing fibers comprises a first type of fiber; the second group of the reinforcing fibers comprises a second type of fiber; and the first type of fiber and the second type of fiber differ.

In one exemplary embodiment, the first group of the reinforcing fibers consists of a first type of fiber; the second group of the reinforcing fibers consists of a second type of fiber; and the first type of fiber and the second type of fiber differ.

In one exemplary embodiment, the first group of the reinforcing fibers comprises a first type of fiber; the third group of the reinforcing fibers comprises a second type of fiber; and the first type of fiber and the second type of fiber differ.

In one exemplary embodiment, the first group of the reinforcing fibers consists of a first type of fiber; the third group of the reinforcing fibers consists of a second type of fiber; and the first type of fiber and the second type of fiber differ.

In one exemplary embodiment, the second group of the reinforcing fibers comprises a first type of fiber; the third group of the reinforcing fibers comprises a second type of fiber; and the first type of fiber and the second type of fiber differ.

In one exemplary embodiment, the second group of the reinforcing fibers consists of a first type of fiber; the third group of the reinforcing fibers consists of a second type of fiber; and the first type of fiber and the second type of fiber differ.

In one exemplary embodiment, the laminate includes a plurality of the reinforcing layers. In one exemplary embodiment, the laminate has approximately 100 layers.

In one exemplary embodiment, the laminate includes a plurality of layers including a first layer and a second layer, wherein a thickness of the first layer differs from a thickness of the second layer.

A laminate, according to one exemplary embodiment, comprises: a first layer comprising a first fabric; a second layer comprising a second fabric; and a third layer comprising a third fabric; wherein first fibers in the first layer are substantially parallel to one another and an axis a; wherein second fibers in the second layer are substantially parallel to one another and an axis b; wherein third fibers in the third layer are substantially parallel to one another and an axis c; wherein the axis b is offset from the axis a, such that that the axis b crosses the axis a; wherein the axis c is offset from the axis a, such that that the axis c crosses the axis a; wherein the second fibers are symmetric with the third fibers about the axis a; wherein the first fibers include fourth fibers and fifth fibers; and wherein an elastic modulus of the fourth fibers differs from an elastic modulus of the fifth fibers. In one exemplary embodiment, the first fabric, the second fabric, and the third fabric are stitched together.

In one exemplary embodiment, the first fabric, the second fabric, and the third fabric are a unitary triaxial fabric.

In one exemplary embodiment, the first fabric is a unidirectional fabric; and the second fabric and the third fabric are a unitary biaxial fabric. In one exemplary embodiment, the unidirectional fabric and the biaxial fabric are stitched together.

In one exemplary embodiment, the axis b is offset from the axis a by approximately −10°; and the axis c is offset from the axis a by approximately +10°.

In one exemplary embodiment, the axis b is offset from the axis a by approximately −15°; and the axis c is offset from the axis a by approximately +15°.

In one exemplary embodiment, the axis b is offset from the axis a by approximately −20°; and the axis c is offset from the axis a by approximately +20°.

In one exemplary embodiment, the axis b is offset from the axis a by approximately −25°; and the axis c is offset from the axis a by approximately +25°.

In one exemplary embodiment, the axis b is offset from the axis a by approximately −30°; and the axis c is offset from the axis a by approximately +30°.

In one exemplary embodiment, the axis b is offset from the axis a by approximately −45°; and the axis c is offset from the axis a by approximately +45°.

In one exemplary embodiment, the axis b is offset from the axis a by between −10° and −30°; and the axis c is offset from the axis a by between +10° and +30°.

In one exemplary embodiment, the axis b is offset from the axis a by between −5° and −45°; and the axis c is offset from the axis a by between +5° and +45°.

In one exemplary embodiment, the axis a corresponds to a warp direction of the first fabric. In one exemplary embodiment, the axis a corresponds to a weft direction of the first fabric.

In one exemplary embodiment, the first fibers are selected from the group consisting of polymer fibers, carbon fibers, aramide fibers, and glass fibers. In one exemplary embodiment, the second fibers are selected from the group consisting of polymer fibers, carbon fibers, aramide fibers, and glass fibers. In one exemplary embodiment, the third fibers are selected from the group consisting of polymer fibers, carbon fibers, aramide fibers, and glass fibers.

In one exemplary embodiment, the first fibers are glass fibers selected from the group consisting of A-type glass fibers, C-type glass fibers, G-glass fiber, E-type glass fibers, S-type glass fibers, H-type glass fibers, and E-CR-type glass fibers. In one exemplary embodiment, the second fibers are glass fibers selected from the group consisting of A-type glass fibers, C-type glass fibers, G-glass fiber, E-type glass fibers, S-type glass fibers, H-type glass fibers, and E-CR-type glass fibers. In one exemplary embodiment, the third fibers are glass fibers selected from the group consisting of A-type glass fibers, C-type glass fibers, G-glass fiber, E-type glass fibers, S-type glass fibers, H-type glass fibers, and E-CR-type glass fibers.

In one exemplary embodiment, the fourth fibers are H-type glass fibers and the fifth fibers are E-CR-type glass fibers.

In one exemplary embodiment, the fourth fibers have a higher elastic modulus than the fifth fibers; the fourth fibers account for between 10 wt % to 40 wt % of the first fibers in the first fabric; and the fifth fibers account for between 60 wt % to 90 wt % of the first fibers in the first fabric.

In one exemplary embodiment, the fourth fibers have a higher elastic modulus than the fifth fibers; the fourth fibers account for between 20 wt % to 30 wt % of the first fibers in the first fabric; and the fifth fibers account for between 70 wt % to 80 wt % of the first fibers in the first fabric.

In one exemplary embodiment, the first fabric is one of knitted, woven, and laid. In one exemplary embodiment, the second fabric is one of knitted, woven, and laid. In one exemplary embodiment, the third fabric is one of knitted, woven, and laid.

A hybrid, multi-axial fabric, according to one exemplary embodiment, comprises: a plurality of reinforcing fibers includes a plurality of first fibers, a plurality of second fibers, and a plurality of third fibers; wherein the first fibers have a first orientation within the fabric; wherein the second fibers have a second orientation within the fabric, the second orientation differing from the first orientation by a first offset; wherein the third fibers have a third orientation within the fabric, the third orientation differing from the first orientation by a second offset; wherein the first fibers include a plurality of fourth fibers and a plurality of fifth fibers; and wherein an elastic modulus of the fourth fibers differs from an elastic modulus of the fifth fibers.

In one exemplary embodiment, the hybrid, multi-axial fabric is a unitary fabric including the reinforcing fibers.

In one exemplary embodiment, the hybrid, multi-axial fabric is formed from a first fabric and a second fabric; wherein the first fabric includes the first fibers; and wherein the second fabric includes the second fibers and the third fibers. In one exemplary embodiment, the first fabric and the second fabric are stitched together.

In one exemplary embodiment, the hybrid, multi-axial fabric is formed from a first fabric, a second fabric, and a third fabric; wherein the first fabric includes the first fibers; wherein the second fabric includes the second fibers; and wherein the third fabric includes the third fibers. In one exemplary embodiment, the first fabric, the second fabric, and the third fabric are stitched together.

In one exemplary embodiment, the first orientation is x; the first offset is approximately x−10°; and the second offset is approximately x+10°.

In one exemplary embodiment, the first orientation is x; the first offset is approximately x−15°; and the second offset is approximately x+15°.

In one exemplary embodiment, the first orientation is x; the first offset is approximately x−20°; and the second offset is approximately x+20°.

In one exemplary embodiment, the first orientation is x; the first offset is approximately x−25°; and the second offset is approximately x+25°.

In one exemplary embodiment, the first orientation is x; the first offset is approximately x−30°; and the second offset is approximately x+30°.

In one exemplary embodiment, the first orientation is x; the first offset is approximately x−45°; and the second offset is approximately x+45°.

In one exemplary embodiment, the first orientation is x; the first offset is between x−10° and x−30°; and the second offset is between x+10° and x+30°.

In one exemplary embodiment, the first orientation is x; the first offset is between x−5° and x−45°; and the second offset is between x+5° and x+45°.

In one exemplary embodiment, the first orientation is 0°. In one exemplary embodiment, the first orientation is 90°.

In one exemplary embodiment, an absolute value of the first offset is different from an absolute value of the second offset.

In one exemplary embodiment, the first fibers account for approximately 20 wt % of the reinforcing fibers in the fabric; and the second fibers and the third fibers account for approximately 80 wt % of the reinforcing fibers in the fabric.

In one exemplary embodiment, the first fibers account for approximately 50 wt % of the reinforcing fibers in the fabric; and the second fibers and the third fibers account for approximately 50 wt % of the reinforcing fibers in the fabric.

In one exemplary embodiment, the first fibers account for between 10 wt % to 50 wt % of the reinforcing fibers in the fabric; and the second fibers and the third fibers account for between 50 wt % to 90 wt % of the reinforcing fibers in the fabric.

In one exemplary embodiment, the reinforcing fibers are selected from the group consisting of polymer fibers, carbon fibers, aramide fibers, and glass fibers.

In one exemplary embodiment, the reinforcing fibers are glass fibers selected from the group consisting of A-type glass fibers, C-type glass fibers, G-glass fiber, E-type glass fibers, S-type glass fibers, H-type glass fibers, and E-CR-type glass fibers.

In one exemplary embodiment, the fourth fibers are H-type glass fibers and the fifth fibers are E-CR-type glass fibers.

In one exemplary embodiment, a tensile strength of the fourth fibers differs from a tensile strength of the fifth fibers.

In one exemplary embodiment, the fourth fibers have a higher elastic modulus than the fifth fibers; wherein the fourth fibers account for between 10 wt % to 40 wt % of the first fibers; and wherein the fifth fibers account for between 60 wt % to 90 wt % of the first fibers.

In one exemplary embodiment, the fourth fibers have a higher elastic modulus than the fifth fibers; wherein the fourth fibers account for between 20 wt % to 30 wt % of the first fibers; and wherein the fifth fibers account for between 70 wt % to 80 wt % of the first fibers.

In one exemplary embodiment, the fourth fibers have a higher tensile strength than the fifth fibers; wherein the fourth fibers account for between 10 wt % to 40 wt % of the first fibers; and wherein the fifth fibers account for between 60 wt % to 90 wt % of the first fibers.

In one exemplary embodiment, the fourth fibers have a higher tensile strength than the fifth fibers; wherein the fourth fibers account for between 20 wt % to 30 wt % of the first fibers; and wherein the fifth fibers account for between 70 wt % to 80 wt % of the first fibers.

In one exemplary embodiment, a type of the first fibers differs from a type of the second fibers.

In one exemplary embodiment, a type of the first fibers differs from a type of the third fibers.

In one exemplary embodiment, a type of the second fibers differs from a type of the third fibers.

In one exemplary embodiment, the fabric is one of knitted, woven, and laid.

A body for connecting to a structure, according to one exemplary embodiment, comprises one of a multi-axial fabric; a multi-axial laminate; a hybrid fabric; a hybrid laminate; a hybrid, multi-axial fabric; and a hybrid, multi-axial laminate.

In one exemplary embodiment, the body include a cylindrical portion.

In one exemplary embodiment, the body is spherical, conical, or elliptical.

In one exemplary embodiment, the body includes a mounting flange.

In one exemplary embodiment, a plurality of bolts are used to fasten the body to the structure. In one exemplary embodiment, the bolts are T-bolts.

In one exemplary embodiment, the body is a wind turbine blade.

In one exemplary embodiment, the body is a root portion of a wind turbine blade.

In one exemplary embodiment, a reinforcing fabric and/or laminate is positioned in the body such that the first fibers are aligned with a primary direction of stress on the body.

Numerous other aspects, advantages, and/or features of the general inventive concepts will become more readily apparent from the following detailed description of exemplary embodiments, from the eventual claims, and from the accompanying drawings and related papers being submitted herewith.

BRIEF DESCRIPTION OF THE DRAWINGS

The general inventive concepts as well as embodiments and advantages thereof are described below in greater detail, by way of example, with reference to the drawings in which.

DETAILED DESCRIPTION

Figure 1A:
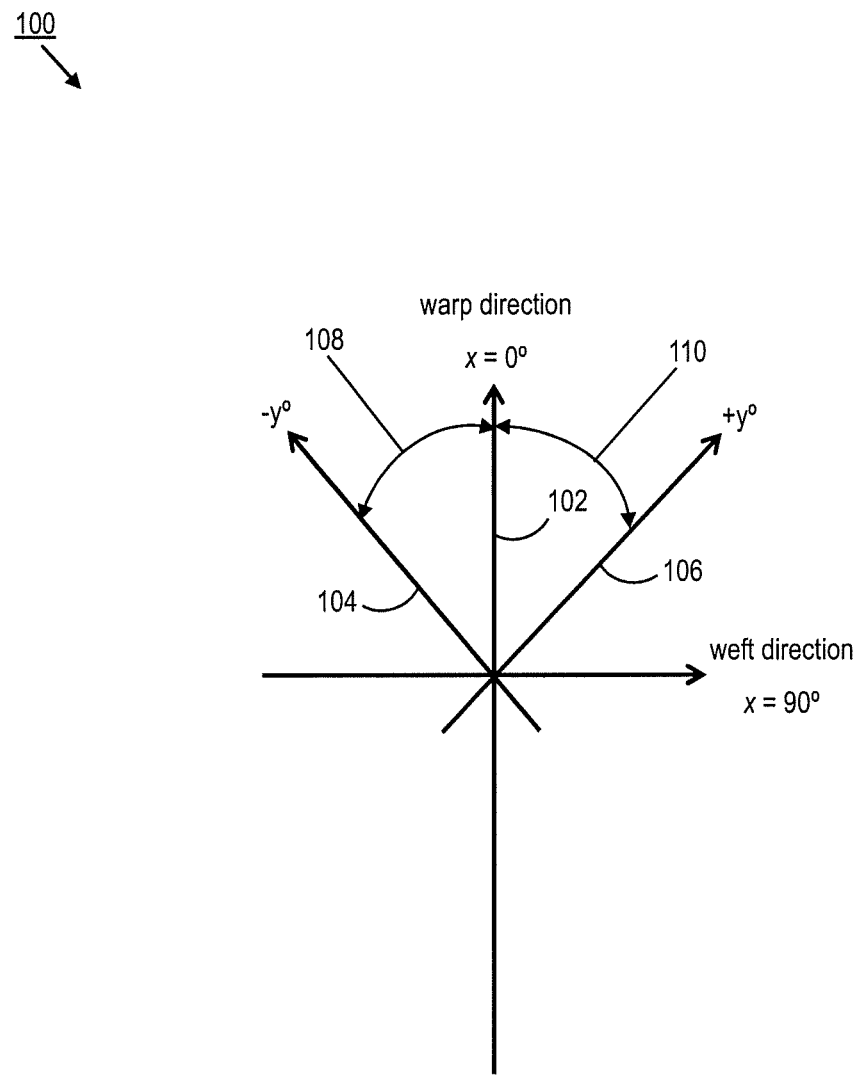
FIG. 1A is a diagram illustrating orientations of reinforcing fibers within a laminate with respect to a warp direction.

While the general inventive concepts are susceptible of embodiment in many different forms, there are shown in the drawings and will be described herein in detail specific embodiments thereof with the understanding that the present disclosure is to be considered as an exemplification of the principles of the general inventive concepts. Accordingly, the general inventive concepts are not intended to be limited to the specific embodiments illustrated herein.

Unless otherwise defined, all technical and scientific terms used herein have the same meaning as commonly understood by one of ordinary skill in the art to which these exemplary embodiments belong. As used herein, the singular forms "a," "an," and "the" are intended to include the plural forms as well, unless the context clearly indicates otherwise.

The inventors found that the use of fabrics and laminates including reinforcing fibers situated in multiple, relatively closely offset orientations provide enhanced performance (e.g., improved strength) and/or cost savings, as compared to conventional fabrics and laminates. Accordingly, the general inventive concepts encompass such multi-axial fabrics, laminates, and the like. The general inventive concepts also encompass structures (e.g., cylindrical and/or flanged bodies) incorporating such fabrics and/or laminates. The structures can be used, for example, in connecting applications. In "connecting applications," one or more structures are connected, joined, or otherwise interfaced with one or more other structures by way of connecting means. Bolt-connected applications are a common type of connecting applications, wherein bolts (e.g., T-bolts), pins, or the like are the connecting means. An example of such a bolt-connected application is the mounting of a wind turbine blade to its hub.

The term "fabric," as used herein, means any woven, knitted, laid, or similarly fabricated fiber material. The fabrics described herein comprise one or more plies of any woven, knitted, laid, or similarly fabricated fiber material. The plies of the fabrics can be fixed to one another using any of the technologies known in the art, such as stitching. The term "laminate," as used herein, means a sheet of material or the like made by bonding or otherwise joining two or more sheets or layers together.

As shown in FIG. 1A, a reinforcing fabric 100 (or laminate comprising such), according to one exemplary embodiment, includes first reinforcing fibers having a first orientation 102 that corresponds to a warp direction (i.e., 0° orientation) of the reinforcing fabric 100. The reinforcing fabric 100 further includes second reinforcing fibers having a second orientation 104 and third reinforcing fibers having a third orientation 106. The second orientation 104 differs from the first orientation 102 by a first offset 108. Likewise, the third orientation 106 differs from the first orientation 102 by a second offset 110.

Figure 1B:
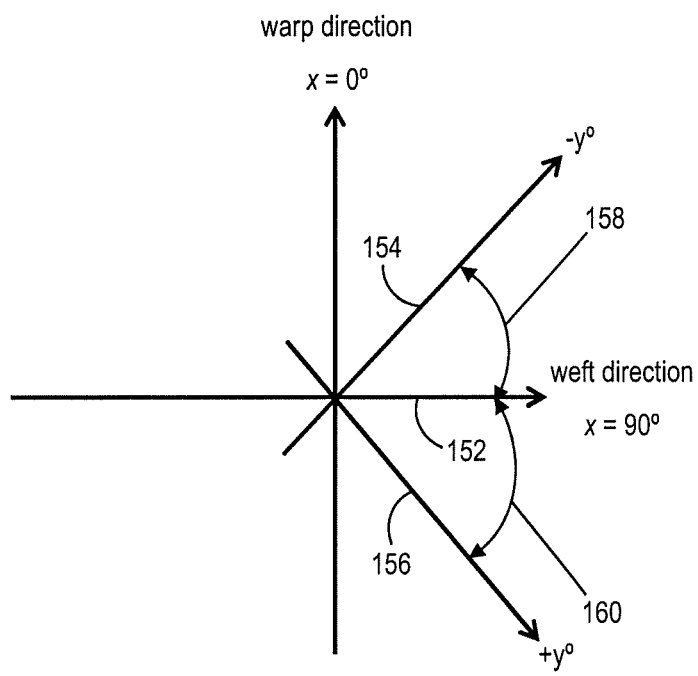
FIG. 1B is a diagram illustrating orientations of reinforcing fibers within a laminate with respect to a weft direction.

As shown in FIG. 1B, a reinforcing fabric 150 (or laminate comprising such), according to one exemplary embodiment, includes first reinforcing fibers having a first orientation 152 that corresponds to a weft direction (i.e., 90° orientation) of the reinforcing fabric 150. The reinforcing fabric 150 further includes second reinforcing fibers having a second orientation 154 and third reinforcing fibers having a third orientation 156. The second orientation 154 differs from the first orientation 152 by a first offset 158. Likewise, the third orientation 156 differs from the first orientation 152 by a second offset 160.

More generally, the general inventive concepts encompass fabrics (e.g., the fabrics 100 and 150) having multiple groups of reinforcing fibers with different closely offset orientations relative to one another. In some exemplary embodiments, three groups of reinforcing fibers are present in the fabric, with each group of reinforcing fibers having a different orientation.

In such a case, a group of first reinforcing fibers has an orientation x; a group of second reinforcing fibers has an orientation y; and a group of third reinforcing fibers has an orientation z. The orientation of the second reinforcing fibers have an orientation of x−y and the third reinforcing fibers have an orientation of x+z. In some exemplary embodiments, |y|=|z|, such that the second reinforcing fibers have an orientation of x−y and the third reinforcing fibers have an orientation of x+y (see FIGS. 1A and 1B).

In some exemplary embodiments, |y|=10°. In some exemplary embodiments, |y|=15°. In some exemplary embodiments, |y|=20°. In some exemplary embodiments, |y|=25°. In some exemplary embodiments, |y|=30°. In some exemplary embodiments, |y|=45°. In some exemplary embodiments, 5°≤|y|≤45°. In some exemplary embodiments, 10°≤|y|≤30°.

In some exemplary embodiments, x=0°. In some exemplary embodiments, x=90°.

In some exemplary embodiments, at least 50% of the first reinforcing fibers have the orientation x. In some exemplary embodiments, at least 60% of the first reinforcing fibers have the orientation x. In some exemplary embodiments, at least 70% of the first reinforcing fibers have the orientation x. In some exemplary embodiments, at least 80% of the first reinforcing fibers have the orientation x. In some exemplary embodiments, at least 90% of the first reinforcing fibers have the orientation x. In some exemplary embodiments, at least 95% of the first reinforcing fibers have the orientation x. In some exemplary embodiments, at least 98% of the first reinforcing fibers have the orientation x.

In some exemplary embodiments, at least 50% of the second reinforcing fibers have the orientation y. In some exemplary embodiments, at least 60% of the second reinforcing fibers have the orientation y. In some exemplary embodiments, at least 70% of the second reinforcing fibers have the orientation y. In some exemplary embodiments, at least 80% of the second reinforcing fibers have the orientation y. In some exemplary embodiments, at least 90% of the second reinforcing fibers have the orientation y. In some exemplary embodiments, at least 95% of the second reinforcing fibers have the orientation y. In some exemplary embodiments, at least 98% of the second reinforcing fibers have the orientation y.

In some exemplary embodiments, at least 50% of the third reinforcing fibers have the orientation z. In some exemplary embodiments, at least 60% of the third reinforcing fibers have the orientation z. In some exemplary embodiments, at least 70% of the third reinforcing fibers have the orientation z. In some exemplary embodiments, at least 80% of the third reinforcing fibers have the orientation z. In some exemplary embodiments, at least 90% of the third reinforcing fibers have the orientation z. In some exemplary embodiments, at least 95% of the third reinforcing fibers have the orientation z. In some exemplary embodiments, at least 98% of the third reinforcing fibers have the orientation z.

In some exemplary embodiments, the first reinforcing fibers are one of polymer fibers, carbon fibers, aramide fibers, and glass fibers.

In some exemplary embodiments, the second reinforcing fibers are one of polymer fibers, carbon fibers, aramide fibers, and glass fibers.

In some exemplary embodiments, the third reinforcing fibers are one of polymer fibers, carbon fibers, aramide fibers, and glass fibers.

In some exemplary embodiments, the first reinforcing fibers, the second reinforcing fibers, and the third reinforcing fibers are glass fibers.

In some exemplary embodiments, the first reinforcing fibers are glass fibers selected from the group consisting of A-type glass fibers, C-type glass fibers, G-glass fiber, E-type glass fibers, S-type glass fibers, H-type glass fibers, and E-CR-type glass fibers.

In some exemplary embodiments, the second reinforcing fibers are glass fibers selected from the group consisting of A-type glass fibers, C-type glass fibers, G-glass fiber, E-type glass fibers, S-type glass fibers, H-type glass fibers, and E-CR-type glass fibers.

In some exemplary embodiments, the third reinforcing fibers are glass fibers selected from the group consisting of A-type glass fibers, C-type glass fibers, G-glass fiber, E-type glass fibers, S-type glass fibers, H-type glass fibers, and E-CR-type glass fibers.

An exemplary E-CR-type glass fiber is the Advantex® brand of glass fibers commercially available from Owens Corning.

In some exemplary embodiments, a laminate includes a plurality of layers, at least one of the layers formed from a reinforcing fabric as disclosed or suggested herein. In some exemplary embodiments, the laminate has approximately 100 layers. The laminate can be formed using any of the technologies known in the art. For example, polymers can be used to form the laminates. In some exemplary embodiments, an epoxy resin is used to form the laminates.

In some exemplary embodiments, the laminate includes a first layer and a second layer, wherein a thickness of the first layer differs from a thickness of the second layer.

In a laminate formed from or otherwise including a reinforcing fabric encompassed by the general inventive concepts (e.g., the fabric 100, the fabric 150), according to one exemplary embodiment, the first reinforcing fibers account for approximately 20 wt % of the reinforcing fibers in the laminate, and the combination of the second reinforcing fibers and the third reinforcing fibers accounts for approximately 80 wt % of the reinforcing fibers in the laminate.

In a laminate formed from or otherwise including a reinforcing fabric encompassed by the general inventive concepts (e.g., the fabric 100, the fabric 150), according to one exemplary embodiment, the first reinforcing fibers account for approximately 50 wt % of the reinforcing fibers in the laminate, and the combination of the second reinforcing fibers and the third reinforcing fibers accounts for approximately 50 wt % of the reinforcing fibers in the laminate.

In a laminate formed from or otherwise including a reinforcing fabric encompassed by the general inventive concepts (e.g., the fabric 100, the fabric 150), according to one exemplary embodiment, the first reinforcing fibers account for between 10 wt % to 50 wt % of the reinforcing fibers in the laminate, and the combination of the second reinforcing fibers and the third reinforcing fibers accounts for between 50 wt % to 90 wt % of the reinforcing fibers in the laminate.

Figure 2:
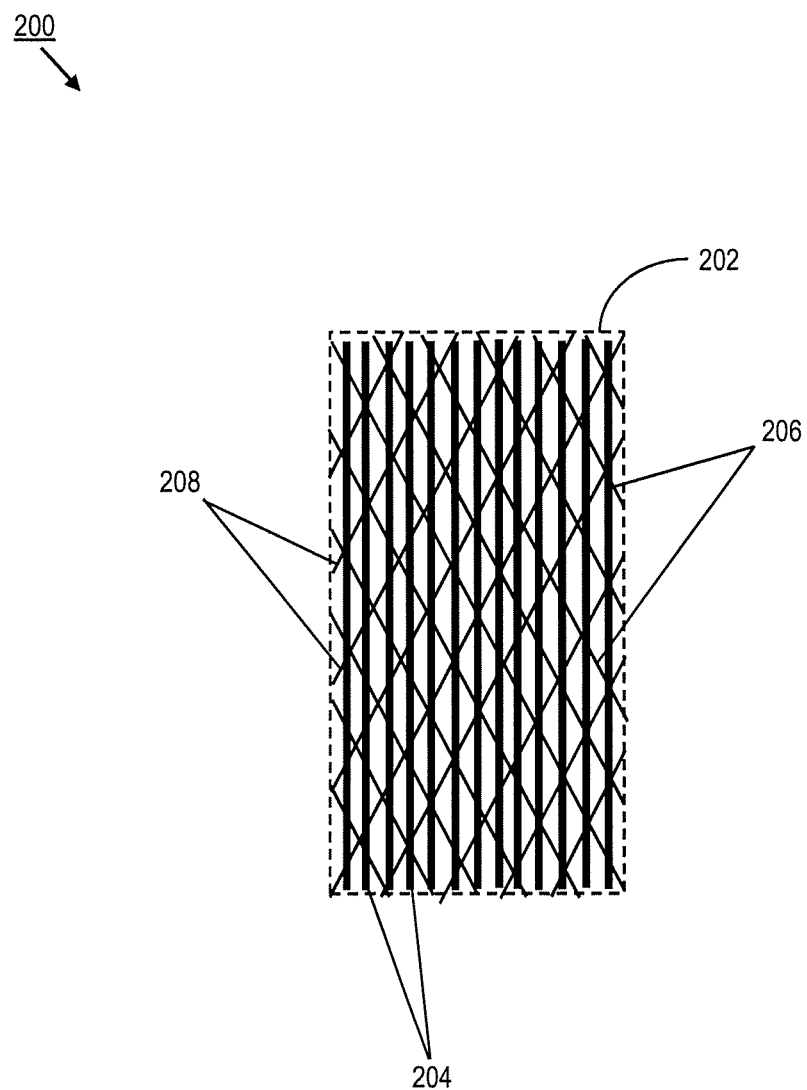
FIG. 2 is a diagram illustrating a triaxial fabric including reinforcing fibers with three different orientations for use in a laminate.

In some exemplary embodiments, a reinforcing fabric encompassed by the general inventive concepts (e.g., the fabric 100, the fabric 150) is formed as a unitary fabric including the reinforcing fibers. For example, as shown in FIG. 2, a reinforcing fabric 200, according to one exemplary embodiment, is a triaxial fabric 202. The triaxial fabric 202 includes first reinforcing fibers 204 having a first orientation, second reinforcing fibers 206 having a second orientation, and third reinforcing fibers 208 having a third orientation.

Figure 3:
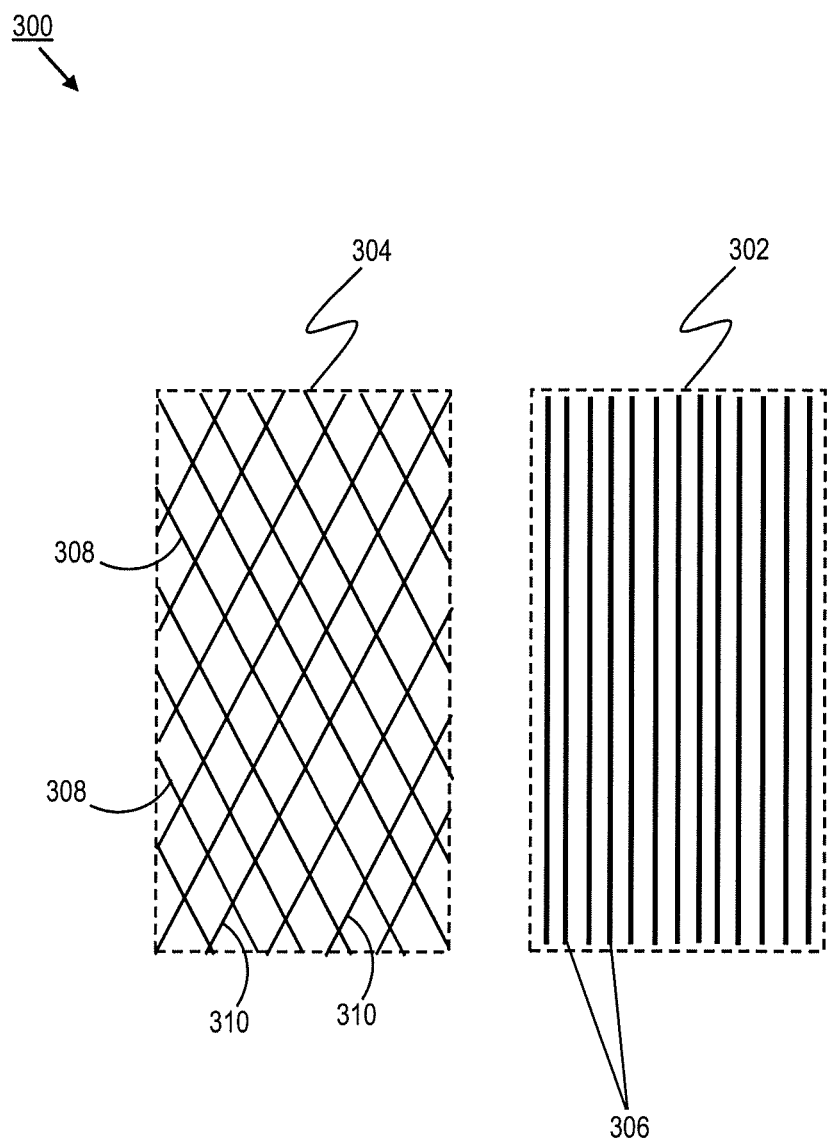
FIG. 3 is a diagram illustrating a biaxial fabric including reinforcing fibers with two different orientations and a unidirectional fabric including reinforcing fibers with a single orientation, the biaxial fabric and the unidirectional fabric being combined for use in a laminate.

In some exemplary embodiments, a reinforcing fabric encompassed by the general inventive concepts (e.g., the fabric 100, the fabric 150) is formed as a combination of two or more fabrics including reinforcing fibers. For example, as shown in FIG. 3, a reinforcing fabric 300, according to one exemplary embodiment, includes a unidirectional fabric 302 and a biaxial fabric 304. The unidirectional fabric 302 includes first reinforcing fibers 306 having a first orientation. The biaxial fabric 304 includes second reinforcing fibers 308 having a second orientation and third reinforcing fibers 310 having a third orientation. The unidirectional fabric 302 and the biaxial fabric 304 are joined or otherwise interfaced to form the reinforcing fabric 300. In some exemplary embodiments, the unidirectional fabric 302 and the biaxial fabric 304 are stitched together.

Figure 4:
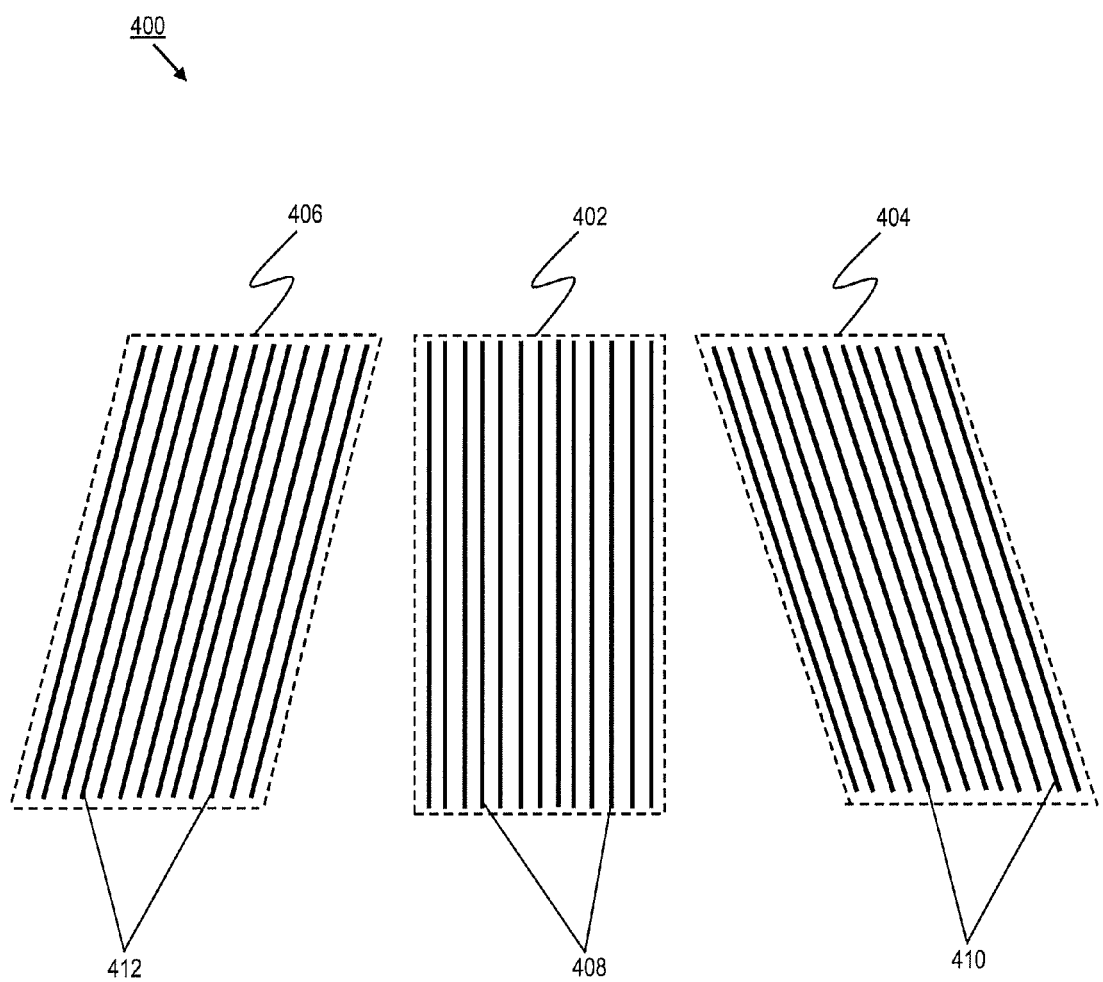
FIG. 4 is a diagram illustrating three unidirectional fabrics, each unidirectional fabric including reinforcing fibers with a single orientation, the unidirectional fabrics being combined for use in a laminate such that the reinforcing fibers in each unidirectional fabric have a different orientation from the reinforcing fibers of the other unidirectional fabrics.
Figure 5:
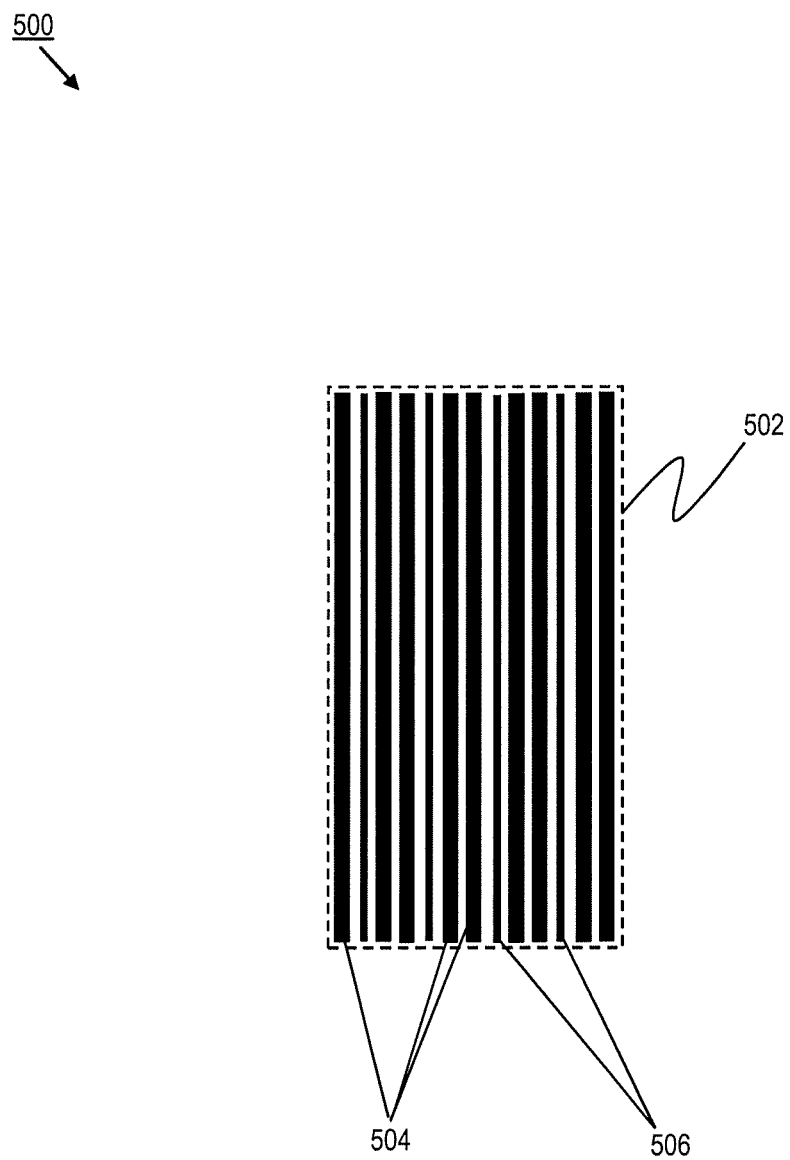
FIG. 5 is a diagram illustrating a reinforcing fabric for a laminate, wherein the reinforcing fabric includes at least one group of reinforcing fibers having the same orientation, wherein the group of reinforcing fibers includes two different types of reinforcing fibers.
Figure 6:
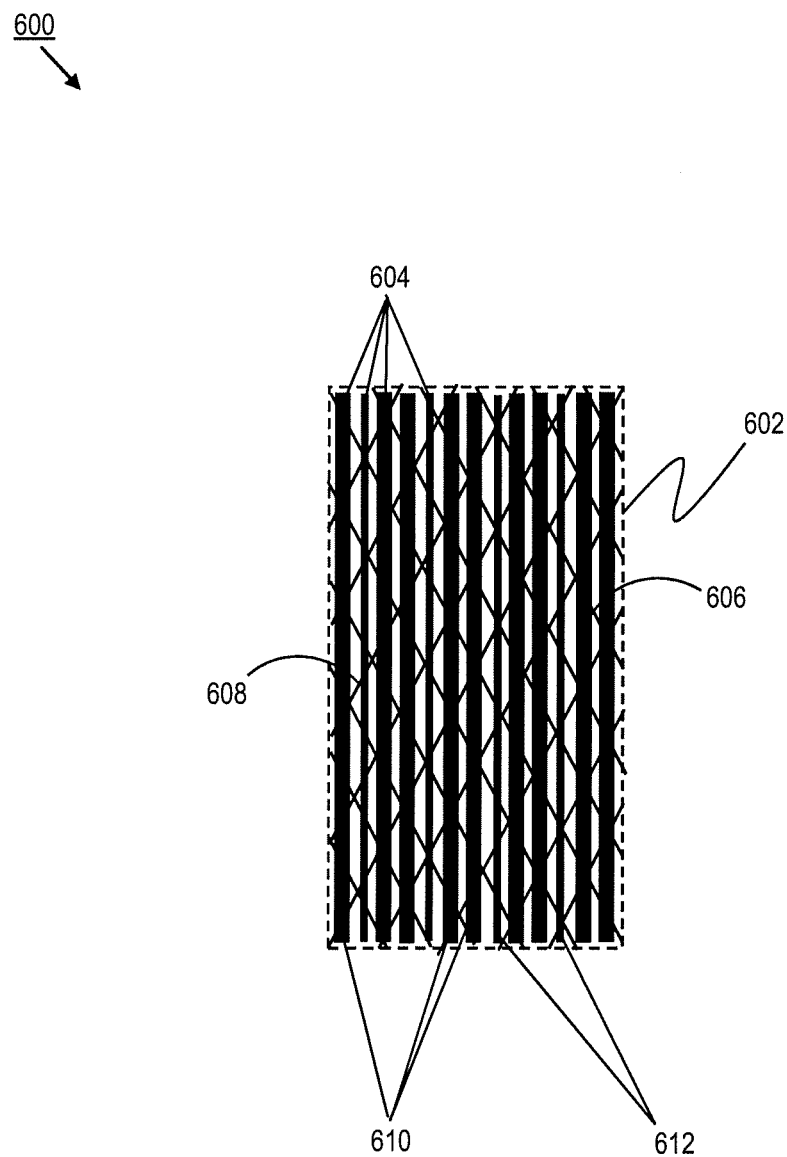
FIG. 6 is a diagram illustrating a reinforcing fabric for a laminate, wherein the reinforcing fabric includes at least three groups of reinforcing fibers with each group of reinforcing fibers having a different orientation within the fabric from the other groups of reinforcing fibers, and at least one of the groups of reinforcing fibers including two different types of reinforcing fibers.

In some exemplary embodiments, a reinforcing fabric encompassed by the general inventive concepts (e.g., the fabric 100, the fabric 150) is formed as a combination of three or more fabrics including reinforcing fibers. For example, as shown in FIG. 4, a reinforcing fabric 400, according to one exemplary embodiment, includes a unidirectional fabric 402, a unidirectional fabric 404, and a unidirectional fabric 406. The unidirectional fabric 402 includes first reinforcing fibers 408 having a first orientation. The unidirectional fabric 404 includes second reinforcing fibers 410 having a second orientation. The unidirectional fabric 406 includes third reinforcing fibers 412 having a third orientation. The unidirectional fabrics 402, 404, and 406 are joined or otherwise interfaced with one another to form the reinforcing fabric 400. The unidirectional fabrics 402, 404, and 406 can be joined together in any order. In some exemplary embodiments, the unidirectional fabrics 402, 404, and 406 are stitched together.

The inventors also found that the use of different types of fibers within a group of reinforcing fibers having the same orientation in a fabric or laminate can contribute to the enhanced performance (e.g., improved strength) and/or cost savings, as compared to conventional fabrics and laminates. For example, a first fiber type and a second fiber type have the same orientation within the fabric or laminate, wherein fibers of the first fiber type have an elastic modulus that is higher than an elastic modulus of fibers of the second fiber type. As another example, a first fiber type and a second fiber type have the same orientation within the fabric or laminate, wherein fibers of the first fiber type have a tensile strength that is higher than a tensile strength of fibers of the second fiber type. Accordingly, the general inventive concepts encompass such hybrid fabrics, laminates, and the like.

The general inventive concepts also encompass structures (e.g., cylindrical and/or flanged bodies) incorporating such hybrid fabrics and/or laminates. The structures can be used, for example, in connecting applications. In "connecting applications," one or more structures are connected, joined, or otherwise interfaced with one or more other structures by way of connecting means. Bolt-connected applications are a common type of connecting applications, wherein bolts (e.g., T-bolts) are the connecting means. An example of such a bolt-connected application is the mounting of a wind turbine blade to its hub.

A reinforcing fabric 500, according to one exemplary embodiment, is a unidirectional fabric 502 including a plurality of reinforcing fibers having the same orientation. The reinforcing fibers include first fibers 504 and second fibers 506. The first fibers 504 have a higher elastic modulus than the second fibers 506.

In some exemplary embodiments, the first fibers are one of polymer fibers, carbon fibers, aramide fibers, and glass fibers.

In some exemplary embodiments, the second fibers are one of polymer fibers, carbon fibers, aramide fibers, and glass fibers.

In some exemplary embodiments, the first fibers and the second fibers are glass fibers.

In some exemplary embodiments, first fibers are H-type glass fibers and the second fibers are E-CR-type glass fibers.

In some exemplary embodiments, the first fibers account for between 10 wt % to 40 wt % of the reinforcing fibers in the reinforcing fabric 500, and the second fibers account for between 60 wt % to 90 wt % of the reinforcing fibers in the reinforcing fabric 500.

In some exemplary embodiments, the first fibers account for between 20 wt % to 30 wt % of the reinforcing fibers in the reinforcing fabric 500, and the second fibers account for between 70 wt % to 80 wt % of the reinforcing fibers in the reinforcing fabric 500.

In view of the above, the general inventive concepts also encompass hybrid, multi-axial fabrics, laminates, and the like. These hybrid, multi-axial fabrics and/or laminates provide enhanced performance (e.g., improved strength) and/or cost savings, as compared to conventional fabrics and laminates. The hybrid, multi-axial fabrics and/or laminates include groups of reinforcing fibers situated in different, relatively closely offset orientations, wherein at least one of the groups of reinforcing fibers having the same orientation includes different types of fibers. For example, the hybrid, multi-axial fabrics and/or laminates represent a combination of a multi-axial fabric (e.g., the fabric 200, 300, or 400) and a hybrid fabric (e.g., the fabric 500).

The general inventive concepts also encompass structures (e.g., cylindrical and/or flanged bodies) incorporating such fabrics and/or laminates. The structures can be used, for example, in connecting applications. In "connecting applications," one or more structures are connected, joined, or otherwise interfaced with one or more other structures by way of connecting means. Bolt-connected applications are a common type of connecting applications, wherein bolts (e.g., T-bolts) are the connecting means. An example of such a bolt-connected application is the mounting of a wind turbine blade to its hub.

A reinforcing fabric 600, according to one exemplary embodiment, is a hybrid, multi-axial fabric 602 including multiple groups of reinforcing fibers with different closely offset orientations relative to one another. In particular, the hybrid, multi-axial fabric 602 includes three groups of reinforcing fibers: a group of first reinforcing fibers having a first orientation 604, a group of second reinforcing fibers having a second orientation 606, and a group of third reinforcing fibers having a third orientation 608.

Because of the hybrid nature of the reinforcing fabric 600, at least one group of its reinforcing fibers having the same orientation includes at least two different fiber types. In particular, the first reinforcing fibers having the first orientation 604 include fourth reinforcing fibers 610 and fifth reinforcing fibers 612. In some exemplary embodiments, an elastic modulus of the fourth reinforcing fibers 610 is greater than an elastic modulus of the fifth reinforcing fibers 612. In some exemplary embodiments, a tensile strength of the fourth reinforcing fibers 610 is greater than a tensile strength of the fifth reinforcing fibers 612.

In some exemplary embodiments, the orientation of the higher modulus fibers (e.g., the fourth reinforcing fibers 610) can be aligned in a direction of greatest stress, fatigue, or like on a structure. For example, in the case of a wind turbine blade profile, the higher modulus fibers can be applied in a blade span direction. The same can be done if higher tensile strength fibers are used.

In some exemplary embodiments, the higher modulus fibers (e.g., the fourth reinforcing fibers 610) can be located in a portion of the structure likely to experience the greatest stress, fatigue, or the like. For example, in the case of a wind turbine blade profile, the higher modulus fibers can be applied in a root section of the wind blade profile. The same can be done if higher tensile strength fibers are used.

In some exemplary embodiments, the fourth reinforcing fibers account for between 10 wt % to 40 wt % of the first reinforcing fibers in the reinforcing fabric 600, and the fifth reinforcing fibers account for between 60 wt % to 90 wt % of the first reinforcing fibers in the reinforcing fabric 600.

In some exemplary embodiments, the fourth reinforcing fibers account for between 20 wt % to 30 wt % of the first reinforcing fibers in the reinforcing fabric 600, and the fifth reinforcing fibers account for between 70 wt % to 80 wt % of the first reinforcing fibers in the reinforcing fabric 600.

In some exemplary embodiments, the reinforcing fabric 600 is formed as a unitary fabric including the reinforcing fibers (see FIG. 2). In some exemplary embodiments, the reinforcing fabric 600 is formed as a combination of two or more fabrics including reinforcing fibers (see FIG. 3). In some exemplary embodiments, the reinforcing fabric 600 is formed as a combination of three or more fabrics including reinforcing fibers (see FIG. 4).

As noted above, the general inventive concepts also encompass structures (e.g., cylindrical and/or flanged bodies) incorporating the inventive fabrics and/or laminates. The structures can be used, for example, in connecting applications. In "connecting applications," one or more structures are connected, joined, or otherwise interfaced with one or more other structures by way of connecting means. Bolt-connected applications are a common type of connecting applications, wherein bolts (e.g., T-bolts) are the connecting means.

An example of such a bolt-connected application is the mounting of a wind turbine blade to its hub.

Use of the inventive fabrics and/or laminates in forming the wind turbine blade can allow for increased blade length, better aerodynamic performance, improved long term fatigue loads, and/or reduced costs. Thus, longer, lighter, and/or stiffer wind turbine blades can be produced using the inventive fabrics and/or laminates, as compared to conventional fabrics and laminates.

In some exemplary embodiments, the structures incorporating the inventive fabrics and/or laminates include any cylindrical body. The diameter of the body may vary. The thickness of the wall of the body may vary.

In some exemplary embodiments, the structures incorporating the inventive fabrics and/or laminates include any spherical, conical, or elliptical body. The dimensions of the body may vary. The thickness of the wall of the body may vary.

In some exemplary embodiments, the structures incorporating the inventive fabrics and/or laminates include any flanged structure.

Any suitable methodology or technique may be employed for producing the structures incorporating the inventive fabrics and/or laminates. For example, the structures may be produced by vacuum infusion.

The above description of specific embodiments has been given by way of example. From the disclosure given, those skilled in the art will not only understand the general inventive concepts and their attendant advantages, but will also find apparent various changes and modifications to the systems and methods disclosed. It is sought, therefore, to cover all such changes and modifications as fall within the spirit and scope of the general inventive concepts, as described and claimed herein, and any equivalents thereof.

The invention claimed is:

1. A hybrid, multi-axial fabric comprising:
a plurality of reinforcing fibers includes a plurality of first fibers, a plurality of second fibers, and a plurality of third fibers;
wherein the first fibers have a first orientation within the fabric;
wherein the second fibers have a second orientation within the fabric, the second orientation differing from the first orientation by a first offset;
wherein the third fibers have a third orientation within the fabric, the third orientation differing from the first orientation by a second offset;
wherein the first fibers include a plurality of fourth fibers and a plurality of fifth fibers;
wherein an elastic modulus of the fourth fibers differs from an elastic modulus of the fifth fibers;
wherein the fourth fibers account for between 10 wt % to 40 wt % of the first fibers; and
wherein the fifth fibers account for between 60 wt % to 90 wt % of the first fibers.

2. The hybrid, multi-axial fabric of claim 1, wherein the hybrid, multi-axial fabric is a unitary fabric including the reinforcing fibers.

3. The hybrid, multi-axial fabric of claim 1, wherein the hybrid, multi-axial fabric is formed from a first fabric and a second fabric;
wherein the first fabric includes the first fibers; and
wherein the second fabric includes the second fibers and the third fibers.

4. The hybrid, multi-axial fabric of claim 3, wherein the first fabric and the second fabric are stitched together.

5. The hybrid, multi-axial fabric of claim 1, wherein the hybrid, multi-axial fabric is formed from a first fabric, a second fabric, and a third fabric;
   wherein the first fabric includes the first fibers;
   wherein the second fabric includes the second fibers; and
   wherein the third fabric includes the third fibers.

6. The hybrid, multi-axial fabric of claim 5, wherein the first fabric, the second fabric, and the third fabric are stitched together.

7. The hybrid, multi-axial fabric of claim 1, wherein the first orientation is x; and
   wherein the first offset is approximately x−10° and the second offset is approximately x+10°.

8. The hybrid, multi-axial fabric of claim 1, wherein the first orientation is x; and
   wherein the first offset is approximately x−15° and the second offset is approximately x+15°.

9. The hybrid, multi-axial fabric of claim 1, wherein the first orientation is x; and
   wherein the first offset is approximately x−20° and the second offset is approximately x+20°.

10. The hybrid, multi-axial fabric of claim 1, wherein the first orientation is x; and
    wherein the first offset is approximately x−25° and the second offset is approximately x+25°.

11. The hybrid, multi-axial fabric of claim 1, wherein the first orientation is x; and
    wherein the first offset is approximately x−30° and the second offset is approximately x+30°.

12. The hybrid, multi-axial fabric of claim 1, wherein the first orientation is x; and
    wherein the first offset is approximately x−45° and the second offset is approximately x+45°.

13. The hybrid, multi-axial fabric of claim 1, wherein the first orientation is x; and
    wherein the first offset is between x−10° and x−30° and the second offset is between x+10° and x+30°.

14. The hybrid, multi-axial fabric of claim 1, wherein the first orientation is x; and
    wherein the first offset is between x−5° and x−45° and the second offset is between x+5° and x+45°.

15. The hybrid, multi-axial fabric of claim 1, wherein the first orientation is 0°.

16. The hybrid, multi-axial fabric of claim 1, wherein the first orientation is 90°.

17. The hybrid, multi-axial fabric of claim 1, wherein an absolute value of the first offset is different from an absolute value of the second offset.

18. The hybrid, multi-axial fabric of claim 1, wherein the reinforcing fibers are selected from the group consisting of polymer fibers, carbon fibers, aramide fibers, and glass fibers.

19. The hybrid, multi-axial fabric of claim 1, wherein the fourth fibers are H-type glass fibers and the fifth fibers are E-CR-type glass fibers.

20. The hybrid, multi-axial fabric of claim 1, wherein a tensile strength of the fourth fibers differs from a tensile strength of the fifth fibers.

* * * * *